(12) United States Patent
Aldworth et al.

(10) Patent No.: US 8,302,617 B2
(45) Date of Patent: Nov. 6, 2012

(54) FLUID CONTROL VALVE

(75) Inventors: Alec John Aldworth, Charmouth (GB);
Philip James Withers, Yeovil (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 841 days.

(21) Appl. No.: 12/187,102

(22) Filed: Aug. 6, 2008

(65) Prior Publication Data

US 2009/0038688 A1 Feb. 12, 2009

(30) Foreign Application Priority Data

Aug. 10, 2007 (GB) .................................. 0715616.9

(51) Int. Cl.
*G05D 13/00* (2006.01)
(52) U.S. Cl. .......... 137/48; 137/492; 251/122; 251/123; 251/318; 2/2.14
(58) Field of Classification Search .................. 137/48, 137/485, 492; 251/120, 118, 122, 123, 318–333, 251/356; 2/2.14
See application file for complete search history.

(56) References Cited

U.S. PATENT DOCUMENTS

| | | | | |
|---|---|---|---|---|
| 738,026 A * | 9/1903 | Gill | ........................ | 137/625.26 |
| 2,782,801 A * | 2/1957 | Ludwig | ................... | 137/625.48 |
| 3,636,978 A * | 1/1972 | Byers | ....................... | 137/625.26 |
| 4,220,178 A * | 9/1980 | Jackson | ..................... | 137/625.3 |
| 4,522,374 A * | 6/1985 | Neff | .............................. | 251/356 |
| 4,856,507 A * | 8/1989 | Ouillon et al. | ........... | 128/204.26 |
| 5,199,426 A * | 4/1993 | Aldworth et al. | ........ | 128/205.24 |
| 6,021,519 A * | 2/2000 | Bardel | ............................. | 2/2.14 |
| 6,450,943 B1 * | 9/2002 | Crome et al. | ................... | 600/19 |
| 6,470,887 B1 * | 10/2002 | Martinez | .................. | 128/207.11 |
| 6,948,514 B1 | 9/2005 | Kramer et al. | | |
| 2007/0023092 A1 | 2/2007 | Yamamoto et al. | | |

FOREIGN PATENT DOCUMENTS

| | | |
|---|---|---|
| GB | 1555145 | 11/1979 |
| GB | 2326443 | 12/1998 |
| GB | 2328493 | 2/1999 |

* cited by examiner

*Primary Examiner* — John K Fristoe, Jr.
*Assistant Examiner* — Jessica Cahill
(74) *Attorney, Agent, or Firm* — MacMillan, Sobanski & Todd LLC

(57) ABSTRACT

A fluid control valve for use in a system for inflating an anti-G garment. The valve includes an elongate chamber in which a valve member is moveable. The chamber has first and second axial ends. An inlet opening in a chamber wall provides for the flow of fluid into the chamber. A valve edge is provided at the second end of the chamber to form an outlet. The valve member has a first portion which closes the first chamber end and is moveable in the chamber between the inlet opening and the first chamber end, an intermediate portion which has a cross sectional area less than that of the chamber wall to permit the inflow of fluid to the chamber, and a second portion including a flow control device which co-operates with the valve edge to control fluid flow from the valve.

14 Claims, 5 Drawing Sheets

FLUID CONTROL VALVE

CROSS-REFERENCE TO RELATED APPLICATIONS

Priority is claimed to British patent application Serial No. 0715616.9 filed Aug. 10, 2007.

STATEMENT REGARDING FEDERALLY SPONSORED RESEARCH OR DEVELOPMENT

Not Applicable.

TECHNICAL FIELD

This invention relates to a fluid control valve and more particularly but not exclusively to a fluid control valve which controls the servo fluid pressure that provides for pressure control for an anti-G suit pressure control valve ("AGV") e.g. in a high altitude environment. Most typically, the fluid to be controlled will be a gas, such for example only, a pressurized oxygen enriched gas.

BACKGROUND OF THE INVENTION

An anti-G suit typically is provided in a highly maneuverable aircraft, such as a fighter aircraft, in which aircrew are subjected to high G-forces during maneuvers, to prevent aircrew from suffering blackouts caused by retreating blood which empties from the head and upper body. The anti-G suit is connected to a G-force sensitive valve which operates to cause pressurization of the anti-G suit automatically when necessary to protect the aircrew. The valve includes a member which moves in response to the applied G-force. In use, the prior art G-force fluid control valve can be subject to substantial vibration. High vibrations can cause damage to the valve and/or cause turbulence in fluid flowing from a valve outlet. This can in turn degrade the performance of the valve.

BRIEF SUMMARY OF THE INVENTION

According to one aspect of the invention we provide a fluid control valve for use in a system for inflating an anti-G garment. The valve may include a body with an elongate chamber in which an elongate valve member is moveable axially. The chamber has first and second axial end chamber parts and an intermediate chamber part. There may be an inlet opening in a chamber wall of the intermediate part which provides for the inflow of fluid into the chamber, and there may be an outlet from the chamber at a second axial end of the chamber where a valve edge is provided. The valve member may have a first portion which at least substantially closes the first axial end of the chamber and is moveable in the first part of the chamber between the inlet opening and the first axial end of the chamber, an intermediate portion which is moveable in the intermediate chamber part and has a cross sectional area less than that of the intermediate chamber part thus to permit the inflow of fluid from the inlet opening, and a second portion which includes a flow control device which co-operates with the valve edge to control fluid flow depending upon the axial position of the valve member in the chamber. The second portion of the valve member, including the entire flow control device, may be receivable in the second axial end of the chamber.

Thus in the event of the valve being subject to high levels of vibration which in a conventional arrangement such as shown in FIG. 1 could result in the forced physical contact between the flow control device and valve edge, by virtue of the invention, this is avoided as the flow control device is receivable within the second axial end of the chamber so that there is no physical contact between the valve control device and the valve edge. Thus the valve of the present invention results in greater valve stability, and more laminar fluid flow from the outlet, in the event of high vibration levels being experienced, for example.

According to another aspect of the invention, a system for inflating an anti-G garment includes a fluid control valve according to the first aspect of the invention, for controlling a servo fluid pressure depending upon G-forces experienced. The system includes a servo pressure operated valve for providing high pressure fluid to the anti-G garment depending upon the servo fluid pressure. A high pressure fluid supply is provided for inflating the anti-G garment. A line from the high pressure supply supplies servo fluid to the servo pressure operated fluid control valve. The fluid control valve controls the servo fluid pressure depending upon G-forces experienced by providing a path for the servo fluid to a low pressure area depending upon the G-forces experienced.

Various objects and advantages of the invention will become apparent from the following detailed description of the invention and the accompanying drawings.

BRIEF DESCRIPTION OF THE DRAWINGS

FIG. 4b is a perspective view of the valve member of FIG. 4a;

FIG. 4c is an alternative perspective view of the valve member of FIG. 4a;

DETAILED DESCRIPTION OF THE INVENTION

Figure 1:
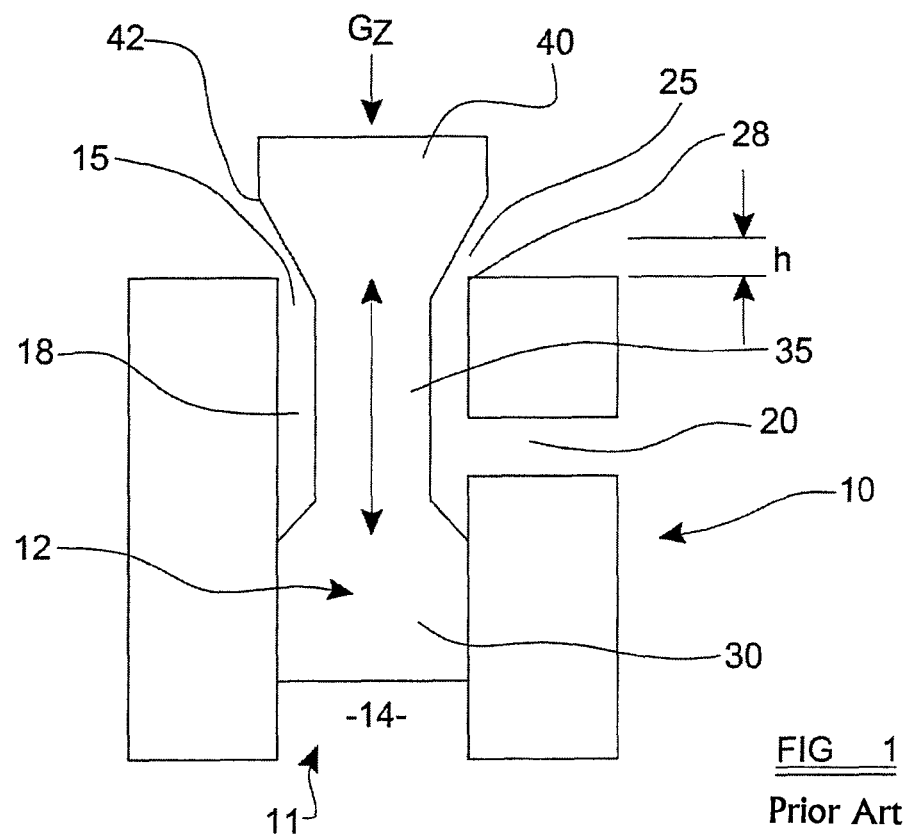
FIG. 1 is an illustrative cross sectional view of a prior art fluid control valve.

Referring first to FIG. 1 part of a typical known G-force sensitive fluid control valve is illustrated. The control valve 10 includes an elongate chamber 11 in which an elongate valve member 12 is moveable axially. The chamber 11 has first 14 and second 15 axial end chamber parts and an intermediate chamber part 18, and an inlet opening 20 in a chamber wall of the intermediate part 18 which provides for the inflow of fluid into the chamber 11. The valve 10 has an outlet 25 from the chamber 11 at the second axial end 15 of the chamber 11 where a valve edge 28 is provided. The valve member 12 includes a first portion 30 which at least substantially closes the first axial end 14 of the chamber 11 and is moveable in the chamber 11 between the inlet opening 20 and the first axial end 14 of the chamber 11. An intermediate portion 35 of the valve member 12 is moveable in the intermediate chamber part 18 and has a cross sectional area less than that of the intermediate chamber part 18 thus to permit the inflow of fluid from the inlet opening 20. A second portion 40 which includes a flow control device 42 of the valve member 12 co-operates with the valve edge 28 to control fluid flow depending upon the axial position of the valve member 10 in the chamber 11.

It can be seen from FIG. 1 that as the valve member moves inwardly of the chamber, the path for fluid between the valve edge and the flow control device will decrease to a point at which the flow control device and the valve edge contact, when fluid flow through the outlet will be stemmed. The flow control device, in the example shown, is a frusto-conical formation and the geometry of the valve edge and flow control device, define a valve control height h.

The axial position of the valve member is, in the case of a servo pressure valve for controlling inflation of an anti-G suit, dependent upon the G-forces being experienced by the aircrew. At high vibration levels though, it can be the case that amplitude of the vibrations experienced can be greater than the valve control height in which case the flow control device and valve edge can be forced into contact which can a) result in physical damage to the flow control device and/or the valve edge, and/or b) turbulent fluid flow from the outlet of the valve. In any event, such contact can result in valve instability, and thus valve performance is degraded. This can result in the average valve control height increasing with a commensurate reduction in the upstream servo fluid pressure, which can cause the pressure in the anti-G suit to fall.

Figure 6:
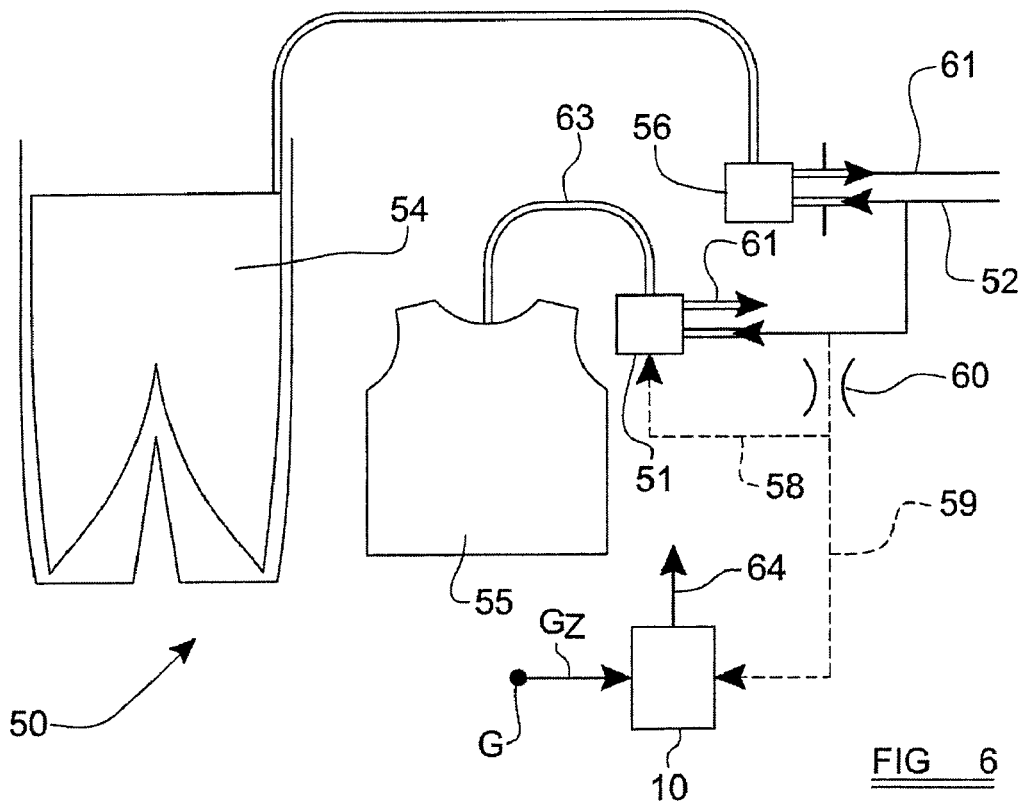
FIG. 6 is an illustrative view of an anti-G garment inflation system which includes the fluid control valve of FIG. 4.

The valve 10 may be used in a system 50 such as shown in FIG. 6, as a fluid control valve for controlling a servo pressure which is provided to a servo pressure operated valve 51 which is operative to supply high pressure fluid, such as in this example, oxygen enriched gas from a high pressure supply 52, to an anti-G garment 55 which in the example, is an anti-G vest, depending upon the servo pressure in a servo fluid line 58, 59. In FIG. 6 it can be seen that there is a second servo pressure operated valve 56 for inflating another anti-G garment, namely anti-G pants 54, with high pressure oxygen enriched gas from the supply 52, in response to a servo pressure which may be controlled by the fluid control valve 10, or a further fluid control valve (not shown) which may be identical to the fluid control valve 10.

In this example, the servo fluid is derived from a high pressure bleed from the supply 52, e.g. via a restrictor 60 or a regulating valve, and the servo fluid then passes to a pressure line where a branch 58 is connected to the servo pressure operated valve 51, and a branch 59 is connected to the fluid control valve 10. In another example, when the high pressure fluid for inflating the anti-G garment 55 is distinct from the oxygen enriched high pressure servo fluid, separate supplies would be required, and only one or neither may be oxygen enriched gas.

The fluid control valve 10 controls the servo pressure in the servo fluid line 58, 59 and hence the servo pressure delivered to the servo pressure controlled valve 51 depending upon G-forces experienced. Thus the system in FIG. 6 includes a G-force sensor G which provides a signal to the control valve 10 which duly responds. The greater the G-forces sensed by the sensor G, the more inflation of the anti-G vest 55 is required. The servo pressure controlled valve 51 is normally biased e.g. by a spring to a fully closed condition in which the high pressure fluid supply 52 is prevented from passing to a pressure line 63 to the anti-G vest 55. The servo pressure in the servo fluid line 58, 59 acts to open the servo pressure controlled valve 51, the pressure delivered by the servo pressure controlled valve 51 increasing with increasing servo pressure. As the servo pressure reduces the delivered pressure decreases. A relief line 61 is provided to relieve pressure in the servo pressure controlled valve 51 to a low pressure area.

Figure 2A:
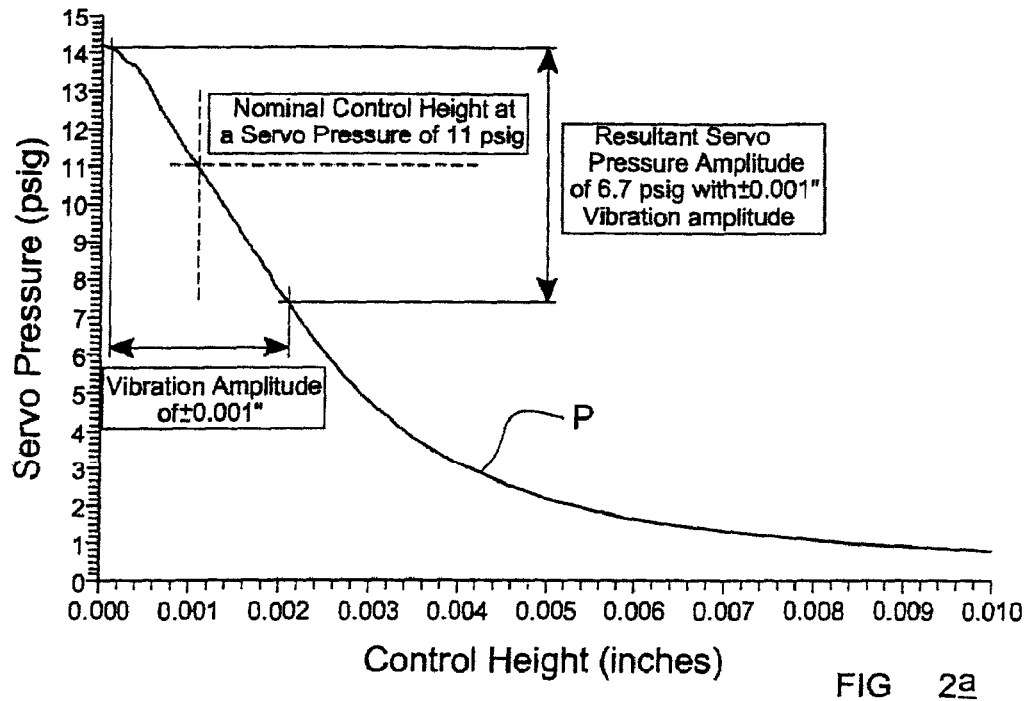
FIGS. 2a and 2b are graphs to illustrate how the FIG. 1 valve responds to environmental vibrations.
Figure 2B:
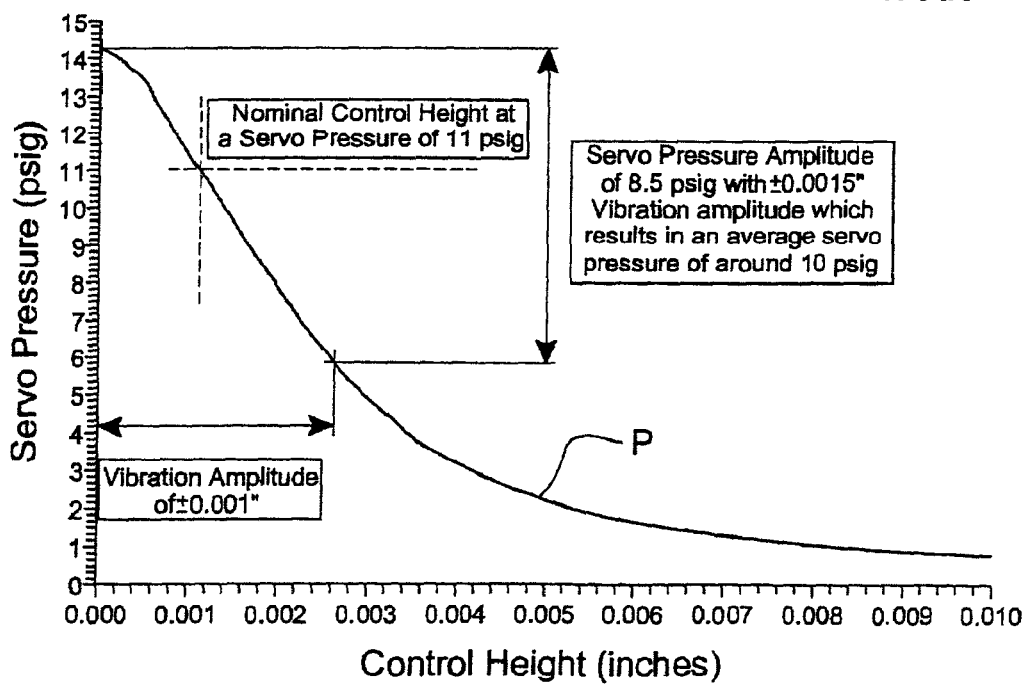

FIGS. 2a and 2b graphically plot at P, the servo valve 10 characteristic namely the control height h against the servo fluid pressure in the servo fluid line 58, 59. The plot P indicates that as G-forces sensed decrease so that the valve member 12 of the valve 10 moves to increase the control height, the servo pressure in the servo fluid line 58, 59 decreases as more and more servo fluid passes the valve member 12 and valve edge 28 and flows to a low pressure area 64 via the outlet 25 from the fluid control valve 10.

In FIG. 2a the plot P shows that when the control valve 10 is commanded to control the upstream servo pressure in the servo fluid line 58, 59 at 11 psig, the valve control height is 0.0011". FIG. 2a further shows that if a sinusoidal vibration, with an amplitude of ±0.001", is applied to the valve 10, the valve member 12 of the valve 10 would move harmoniously with the vibration, which in turn would cause the upstream servo pressure to oscillate at an amplitude of 6.7 psig. This would have a minimal effect on the average upstream servo pressure, and hence little effect on the extent of opening of the servo pressure controlled valve 51 and hence on the degree of inflation of the anti-G vest 55.

However if the vibration amplitude is increased to ±0.0015" (as shown in FIG. 2b) the flow control device 42 of the fluid control valve 10 will, as a result of the vibration, now start to contact the valve edge 28. This will result in valve 10 instability, e.g. turbulent fluid flow from the outlet 25 of the valve 10, and this will cause the average upstream servo pressure to drop to around 10 psig. This will cause the G-vest 55 pressure to fall significantly, which will reduce the protection to the crew member. If the vibration amplitude is increased further, the fluid control valve 10 becomes more unstable and the servo pressure and G-vest 55 pressure may reduce to a dangerous inflation level.

The flow control valve 100 (FIG. 3) of the first aspect of the invention is, in a system according to the second aspect of the invention, a replacement for the prior proposed control valve 10 described above. Parts of the fluid control valve 100 in accordance with the invention which are similar to the prior art fluid control valve 10 described above are given the same references in FIGS. 3, 4a, 4b and 4c.

Referring now to FIGS. 3, 4a, 4b and 4c, the fluid control valve 100 includes an elongate chamber 11 in which an elongate valve member 12 is moveable axially. The chamber 11 has first 14 and second 15 axial end chamber parts and an intermediate chamber part 18. An inlet opening 20 in a chamber wall of the intermediate part 18 provides for the inflow of servo fluid into the chamber 11 from the servo fluid branch line 59. The valve 100 has an outlet 25 from the chamber 11 at a second axial end 15 of the chamber 11 where a valve edge 28 is provided. The outlet 25 is connected to the line 64 which extends to the low pressure area, so that servo fluid which passes the valve member 12 flows to the low pressure area, i.e. in an aircraft application, overboard.

The valve member 12 includes a first portion 30 which at least substantially closes the first axial end 14 of the chamber 11 and is moveable in the chamber 11 between the inlet opening 20 and the first axial end part 14 of the chamber 11. An intermediate portion 35 of the valve member 12 is moveable in the intermediate chamber part 18 and has a cross sectional area less than that of the intermediate chamber part 18 to permit the inflow of fluid from the inlet opening 20. A second portion 40 of the valve member 12 includes a flow control device 42 which co-operates with the valve edge 28 to control fluid flow and hence the servo pressure in the upstream servo fluid line 58, 59, depending upon the axial position of the valve member 12 in the chamber 11.

In accordance with the present invention, the second portion 40 of the valve member 12 including the entire flow control device 42 is receivable in the second axial end 15 of the chamber 11. The second end portion 40 includes a cylindrical part 70 which has a diameter slightly less than the diameter of the circumferential valve edge 28 and second axial end 15 of the chamber 11 and thus the second portion 40 is slidable in and out of the second axial end of the chamber 11 such that the flow control device 42 does not make physical contact with the valve edge 28.

In this example the reduced cross section intermediate portion 35 of the valve member 12 is provided by a plurality of axially extending flats 72 so that fluid entering the chamber 11 via the inlet 20, can flow freely about the intermediate portion 35, and the flow control device 42 is provided by a plurality, three in this example, of planar transition faces 74 between the flats 72 and the cylindrical part 70 of the second valve member portion 70. The first axial end 30 of the valve member 12 is also a cylindrical part, and is slidable in the commensurately cylindrical first axial end 14 of the chamber 11.

The valve member 12 includes a plurality of axially extending guide surfaces 75, three in this example, although a different number of guide surfaces, including a single guide surface could in a different embodiment be sufficient, to guide the valve member 12 for sliding in the chamber 11. The guide surfaces 75 are in the example, flutes which extend axially from a position at or adjacent the intermediate portion 35 of the valve member 12, to the cylindrical part 70 of the second portion 40. The valve member 12 is responsive to G-forces experienced in the $G_z$ direction. In the example, a weight (not shown) may move the valve member 12 axially, inwardly of the chamber 11 in response to increasing G-force, against the force of a restoring spring (not shown).

Figure 5:
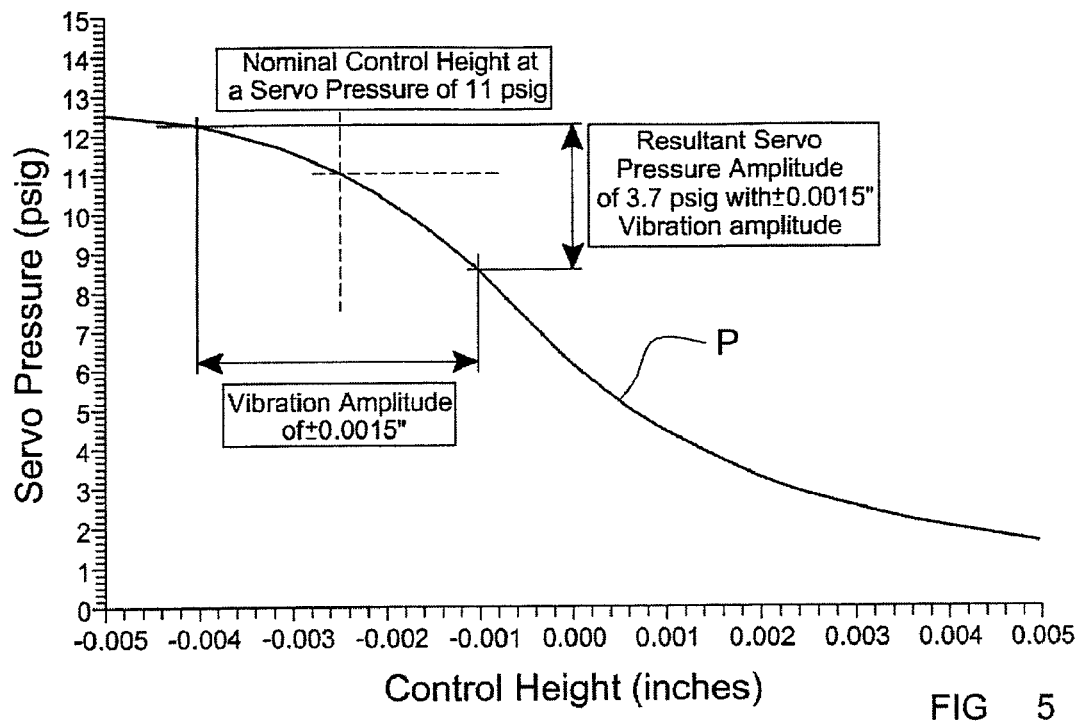
FIG. 5 is a graph similar to FIG. 2b but illustrating the response of the FIG. 3 valve to environmental vibration.

The fluid control valve 100 in accordance with the invention, has the servo pressure versus valve control height h characteristic P shown in FIG. 5. The geometry of the three transition faces 74 of the valve member 12 and because the valve member 11 can slide into the chamber 11 without the flow control device 42 and valve edge 28 contacting, a dual gain characteristic can be achieved that allows the valve 100 to operate at higher levels of vibration and to remain in better control than a conventional control valve 10.

FIG. 5 shows that when the fluid control valve 100 in accordance with the invention is commanded to control the servo pressure in the upstream servo fluid line 58, 59 at 11 psig where the valve control height h is −0.0025". The fluted valve member 12 can pass into the valve edge 28 and therefore the control height h can be negative. If a sinusoidal vibration, with an amplitude of ±0.0015" is applied to the control valve 100, the control valve body and hence valve chamber 11 would move harmoniously with the vibration, which in turn would cause the servo pressure in the upstream servo fluid line 58, 59 to oscillate at an amplitude of 3.7 psig. This would have a minimal effect on the average servo pressure in the line 58, 59 or on the opening of the servo pressure controlled valve 51 and hence on the degree of inflation of the anti-G vest 55. Further, the fluid flow through the outlet 25 will be more laminar than with the prior art valve 10. It can therefore be seen that a fluid control valve 100 in accordance with the present invention is able to maintain a broadly correct anti-G inflation level at much higher applied or environmental vibration levels than the conventional fluid control valve 10.

Figure 3:
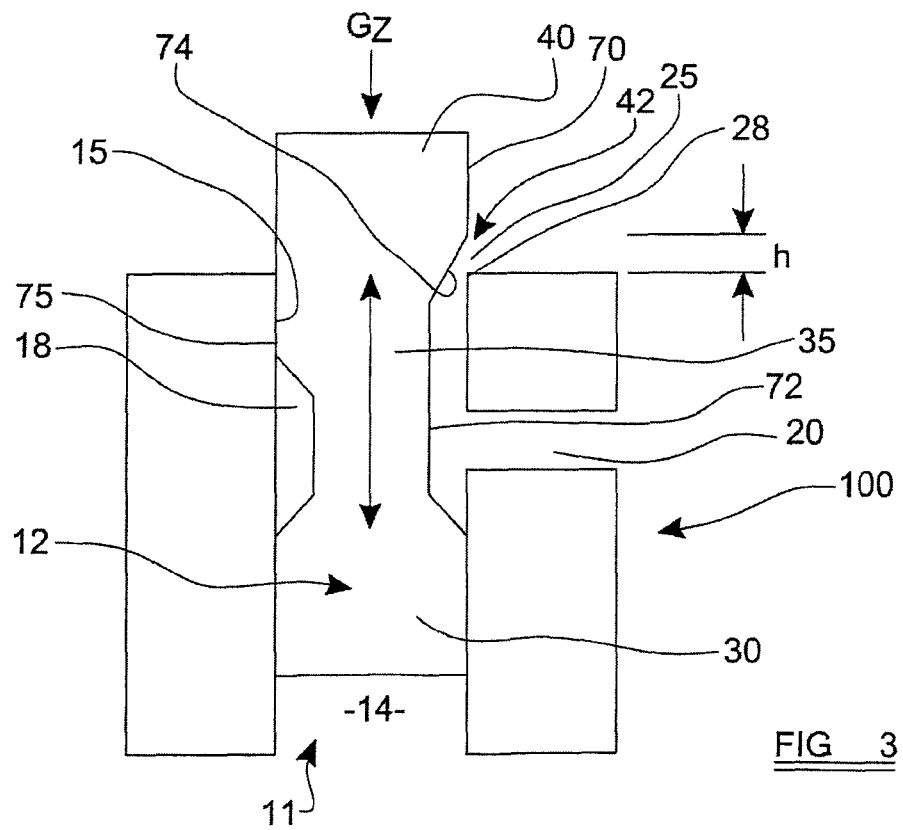
FIG. 3 is a view similar to FIG. 1 but of a fluid control valve in accordance with the first aspect of the invention.
Figure 4A:
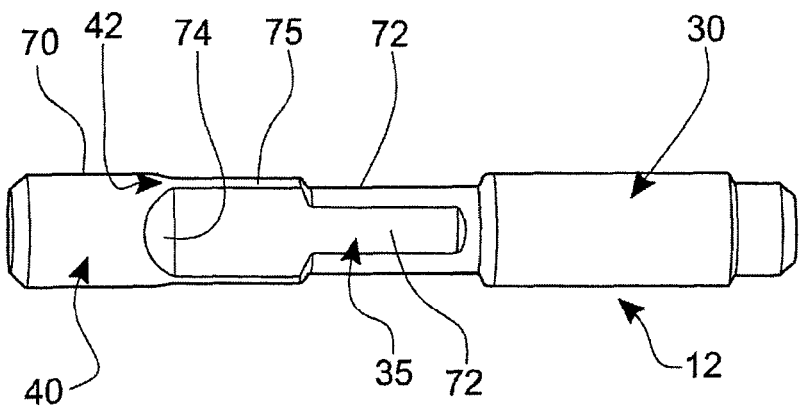
FIG. 4a is a side view of a valve member of the fluid control valve of FIG. 3.
Figure 4B:
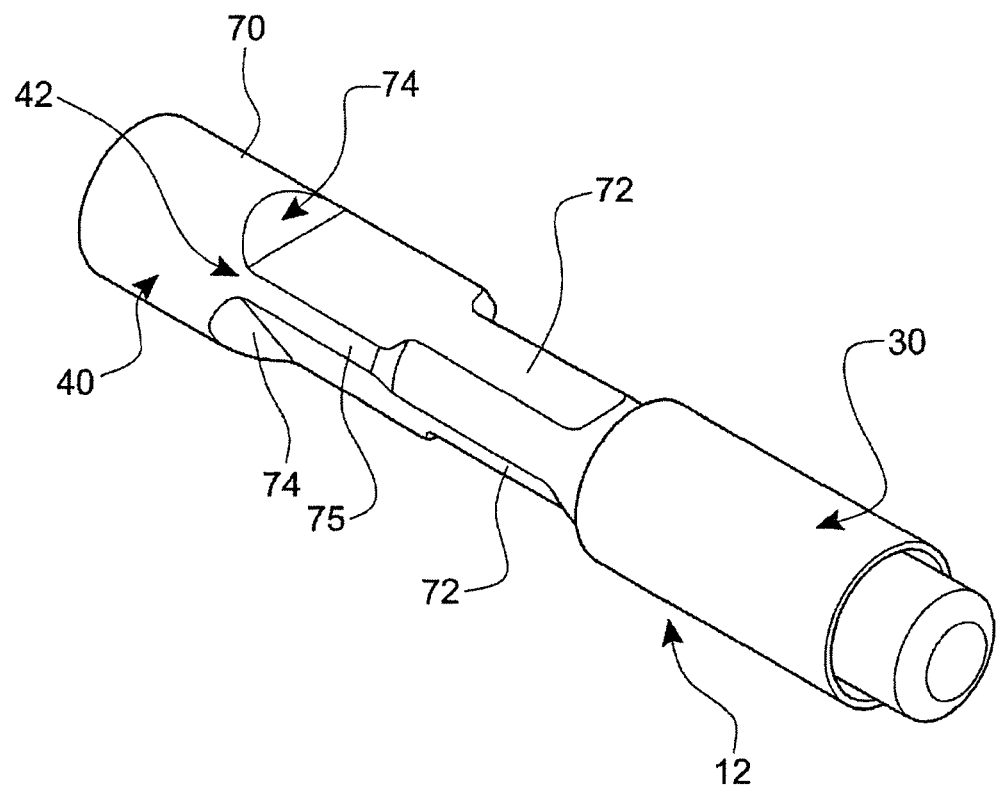
Figure 4C:
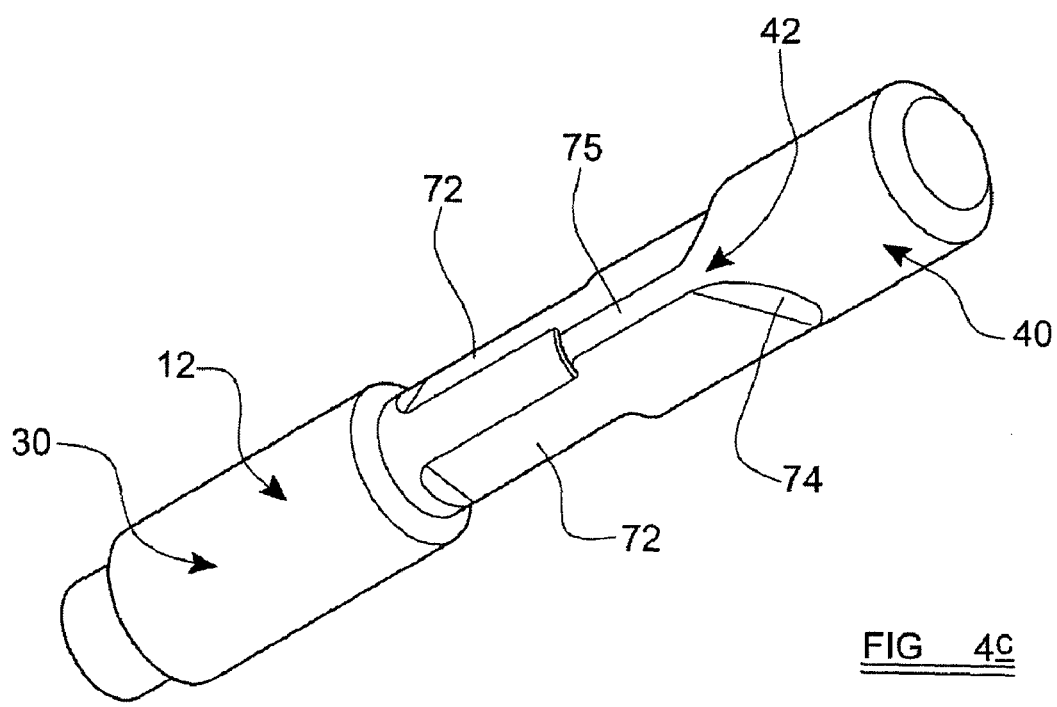

Various modifications may be made without departing from the scope of the invention. For example the drawing of FIG. 3 is purely illustrative and a wide variation in actual control valve 100 configurations is possible. The plot P of servo pressure vs control height h shown in FIG. 5 is purely exemplary for a particular configuration of control valve 100 tested. FIGS. 4a, 4b and 4c are merely illustrative of particular configurations of valve member 12. If desired, the reduced cross section intermediate portion 35 of the valve member 12 may be otherwise achieved than by providing the flats 72 as indicated, in which case the transition faces 74 need not be planar as indicated but may be of other configurations. The flow control valve 100 has been described in relation to its use in controlling a servo pressure for inflating an anti-G garment, but it will be appreciated that the valve 100 may have other applications.

The invention claimed is:

1. A system including a source of pressurized gas, an anti-G garment and a gas control valve for controlling inflation of said anti-G garment with pressurized gas in response to experienced G forces, said valve including a body with an elongate chamber in which an elongate valve member is moveable axially, the chamber having first and second axial end chamber parts and an intermediate chamber part, an inlet opening in a chamber wall of the intermediate part which provides for the inflow of pressurized gas into the chamber, and an outlet from the chamber at the second axial end of the chamber where a valve edge is provided, the valve member including a first portion which at least substantially closes the first axial end of the chamber and is moveable in a first part of the chamber between the inlet opening and the first axial end of the chamber, an intermediate portion which is moveable in the intermediate chamber part and has a cross sectional area less than that of the intermediate chamber part thus to permit the inflow of pressurized gas from the inlet opening, and a second portion which includes a flow control device which co-operates with the valve edge to control gas flow depending upon the axial position of the valve member in the chamber, and wherein the second portion of the valve member, including the entire flow control device, is receivable in the second axial end of the chamber, and wherein the second portion of the valve member is slidable in and out of the second axial end of the chamber without the flow control device making physical contact with the valve edge.

2. A system according to claim 1 wherein the first axial end of the chamber is substantially cylindrical, and wherein the first portion of the valve member is commensurately cylindrical.

3. A system according to claim 1 wherein the second axial end of the chamber is substantially cylindrical and the valve edge is a circumferential edge.

4. A system according to claim 1 and further including a servo valve connected for inflating the anti-G garment with pressurized gas, and wherein the control valve is connected to control the servo valve.

5. A system according to claim 1 wherein the valve member includes an axially extending guide surface which guides the second portion of the valve member relative to the valve edge, as the valve member moves axially.

6. A system according to claim 5 wherein the guide surface extends from a position at or adjacent the intermediate portion of the valve member axially to a cylindrical part of the second valve member portion which is axially beyond the flow control device.

7. A system according to claim 1 wherein the reduced cross sectional area intermediate portion includes a plurality of axially extending flats.

8. A system according to claim 7 where the second axial end of the chamber is substantially cylindrical and the valve edge is a circumferential edge, and wherein the flow control device includes a plurality of transition faces between the flats and the second portion of the valve member.

9. A system according to claim 8 wherein when the valve member is axially moveable in the chamber to a position wherein the cylindrical part of the second portion of the valve member closes the valve outlet.

10. A system according to claim 8 wherein the intermediate valve member portion includes the flats, and wherein the flow control device includes three generally planar transition faces.

11. A system including an anti-G garment and a control valve for controlling inflation of said anti-G garment with pressurized gas from a high pressure gas supply, said pressurized gas control valve including a body with an elongate chamber in which an elongate valve member is moveable axially, the chamber having first and second axial end chamber parts and an intermediate chamber part, a pressurized gas inlet opening in a chamber wall of the intermediate part which provides for the inflow of pressurized gas into the chamber, and an outlet from the chamber at the second axial end part of the chamber where a valve edge is provided, the valve member including a first portion which at least substantially closes the first axial end part of the chamber and is moveable in the first axial end part of the chamber between the inlet opening and the first axial end part of the chamber, wherein the valve member has an intermediate portion which is moveable in the intermediate chamber part and has a cross sectional area less than that of the intermediate chamber part thus to permit the inflow of pressurized gas from the inlet opening, and a second portion including a flow control device which co-operates with the valve edge to control gas flow depending upon the axial position of the valve member in the chamber, wherein the second portion of the valve member, including the entire flow control device, is receivable in the second axial end part of the chamber, the control valve controlling a servo gas pressure depending upon G-forces experienced, and wherein the system includes a servo pressure operated valve for providing high pressure gas to the anti-G garment depending upon the servo gas pressure, and wherein the second portion of the valve member is slidable in and out of the second axial end of the chamber without the flow control device making physical contact with the valve edge.

12. A system according to claim 11 wherein the system includes a line from the high pressure gas supply for supplying servo gas to the servo pressure operated valve, the gas control valve controlling the servo gas pressure depending upon G forces experienced, by providing a path for the servo gas to a low pressure area depending upon the G-forces experienced.

13. A system according to claim 11 wherein the system includes a sensor apparatus for sensing G-forces and communicating a signal to the valve member of the pressurized gas control valve to axially move the valve member in the chamber to a position which depends on the magnitude of the G forces sensed.

14. A system according to claim 13 wherein the signal from the sensor apparatus tends to move the valve member inwardly of the chamber in opposition to an opposing force.

* * * * *